US012042446B2

(12) United States Patent
King

(10) Patent No.: US 12,042,446 B2
(45) Date of Patent: Jul. 23, 2024

(54) WHEELCHAIR STAND

(71) Applicant: The Tinkers Shop, LLC, Lewiston, MI (US)

(72) Inventor: Clifford King, Lewiston, MI (US)

(73) Assignee: The Tinkers Shop, LLC, Lewiston, MI (US)

( * ) Notice: Subject to any disclaimer, the term of this patent is extended or adjusted under 35 U.S.C. 154(b) by 0 days.

(21) Appl. No.: 18/373,474

(22) Filed: Sep. 27, 2023

(65) Prior Publication Data

US 2024/0099915 A1 Mar. 28, 2024

Related U.S. Application Data

(60) Provisional application No. 63/410,454, filed on Sep. 27, 2022.

(51) Int. Cl.

*A61G 5/10* (2006.01)
*B66F 7/02* (2006.01)
*A61G 7/10* (2006.01)
*A61H 3/04* (2006.01)

(52) U.S. Cl.

CPC ................ *A61G 5/104* (2013.01); *B66F 7/02* (2013.01)

(58) Field of Classification Search

CPC ........ A61G 5/104; A61G 7/1038; A61G 7/10; A61G 7/1046; A61G 2200/34; B66F 7/02; A61H 3/04

See application file for complete search history.

(56) References Cited

U.S. PATENT DOCUMENTS 5,526,541 A * 6/1996 Massey ................ A61G 7/1098 5/81.1 RP
7,354,382 B1 * 4/2008 Warren, II ............... A61H 3/04 482/68
2002/0183177 A1 * 12/2002 Hoffman .............. A61H 1/0218 482/148

* cited by examiner

*Primary Examiner* — Bayan Salone
(74) *Attorney, Agent, or Firm* — Carlson, Gaskey & Olds, P.C.

(57) ABSTRACT

A wheelchair stand may include a base; a vertical support bar extending upward from the base; an upper bar extending transversely from the vertical support bar and spaced vertically away from the base; a hanger supported by the upper bar and spaced away from the vertical support bar; and a strap supported by the hanger. A method of maintaining a wheelchair may include: a) moving the wheelchair to a position below a hanger; b) positioning a strap below the wheelchair; c) connecting the strap to opposite ends of the hanger; and d) shortening the strap to raise the wheelchair.

10 Claims, 6 Drawing Sheets

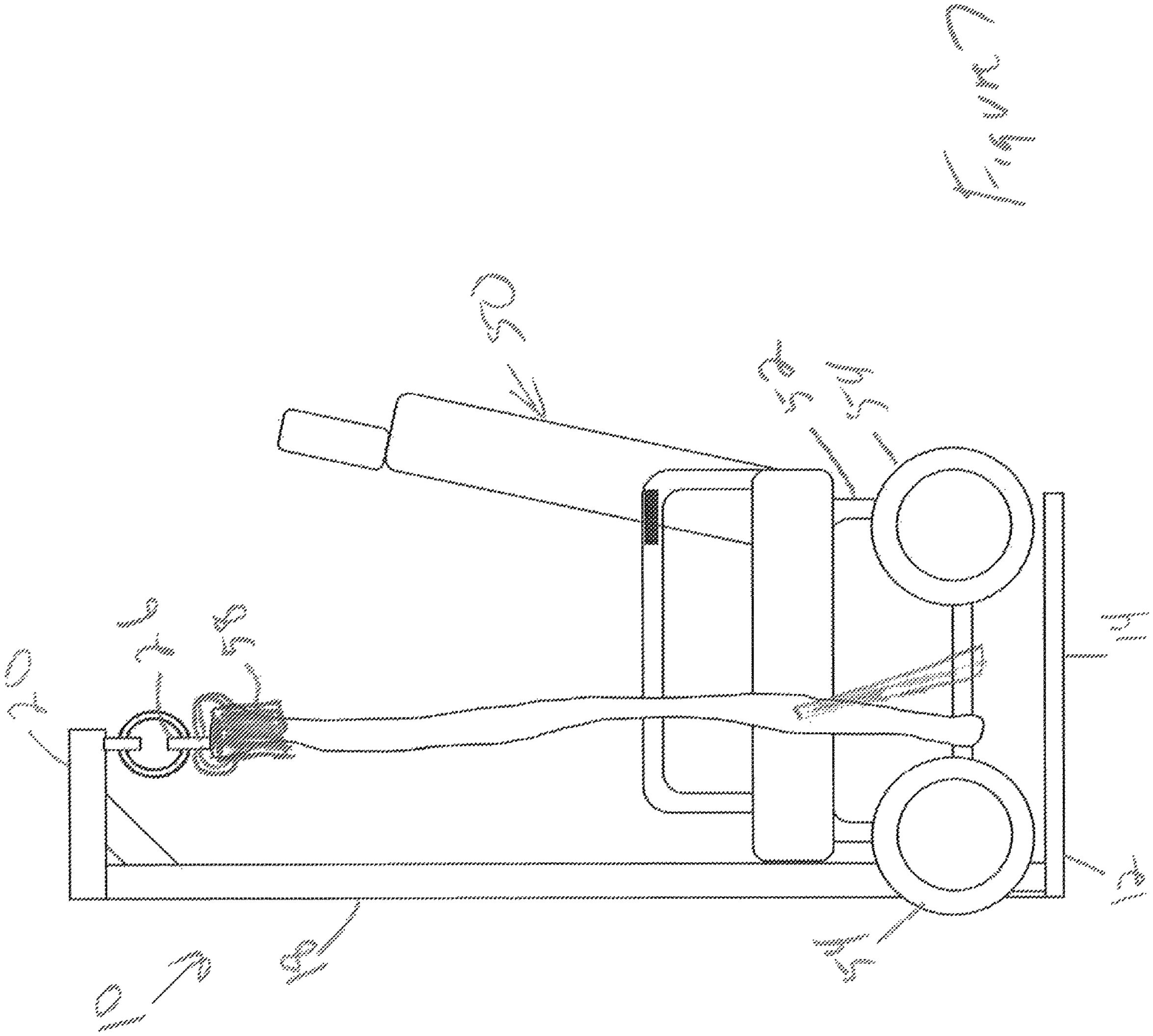

WHEELCHAIR STAND

BACKGROUND

Powered wheelchairs occasionally require maintenance and repair. They are typically very heavy and can be difficult to stabilize during maintenance.

SUMMARY

In one embodiment, the techniques described herein relate to a wheelchair stand including: a base; a vertical support bar extending upward from the base; an upper bar extending transversely from the vertical support bar and spaced vertically away from the base; a hanger supported by the upper bar and spaced away from the vertical support bar; and a strap supported by the hanger.

A method of maintaining a wheelchair may include: a) moving the wheelchair to a position below a hanger; b) positioning a strap below the wheelchair; c) connecting the strap to opposite ends of the hanger; and d) shortening the strap to raise the wheelchair.

BRIEF DESCRIPTION OF THE DRAWINGS

FIG. 7 shows the wheelchair stand and wheelchair of FIG. 6, with the wheelchair lifted off the floor.

DETAILED DESCRIPTION

Figure 1:
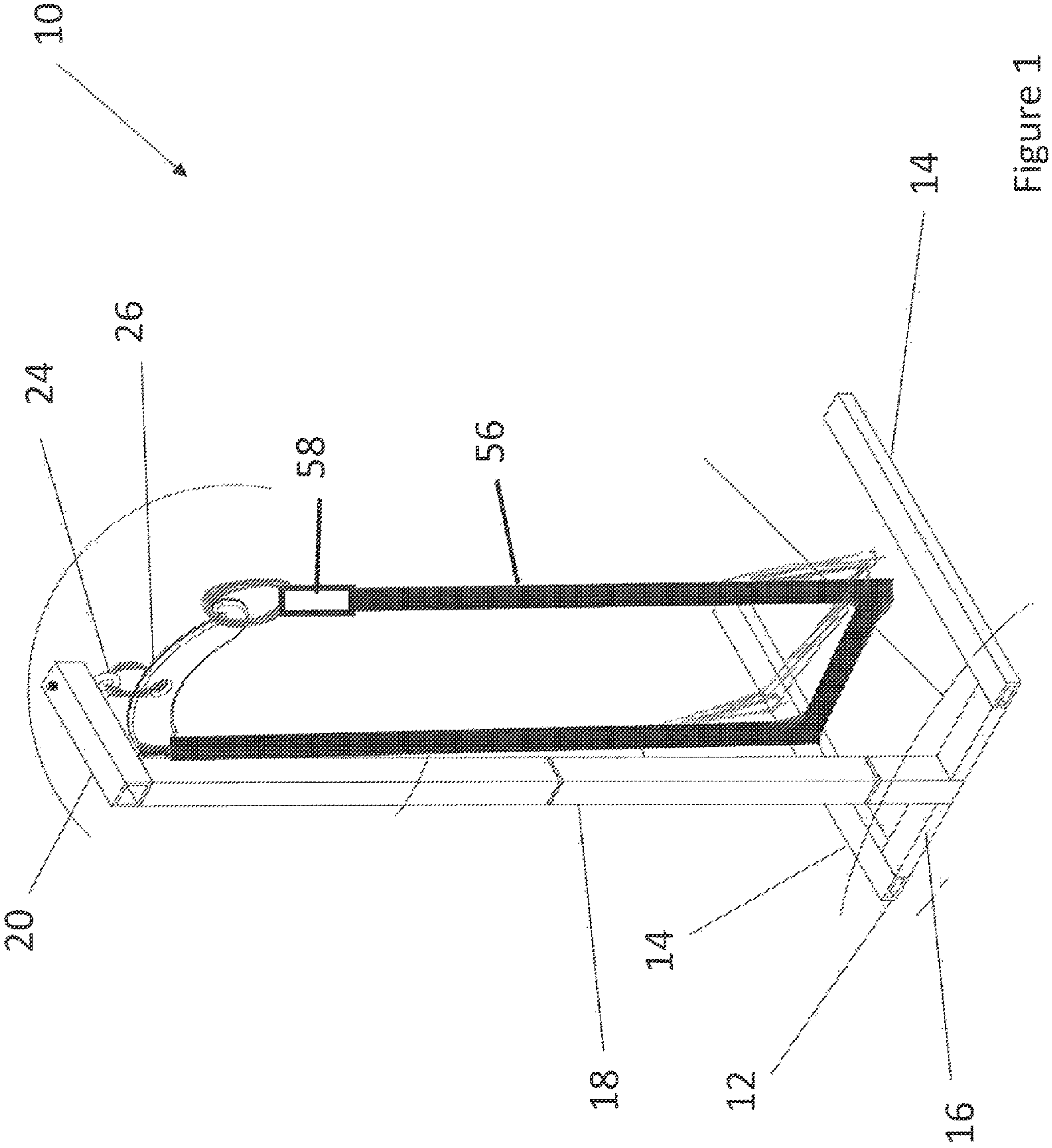
FIG. 1 is a perspective view of a wheelchair stand.

A wheelchair stand 10 according to one example is shown in FIG. 1. The wheelchair stand 10 includes a base 12, which includes a pair of runners 14 extending forward of a rear bar 16. A vertical support bar 18 extends vertically from the rear bar 16. As shown, the vertical support bar 18 may be formed in several connected segments. The rear bar 16 may be formed by two segments extending between the runners 14 to a lower end of the vertical support bar 18. Gussets (not shown) may connect the vertical support bar 18 to the base 12 to support the vertical support bar 18. An upper bar 20 is cantilevered from an upper end of the vertical support bar 18 and may be supported by a gusset (not shown) between the vertical support bar 18 and the upper bar 20.

The runners 14 and rear bar 16 may be metal hollow tubes of rectangular cross-section (such as 1" by 2"). The vertical support bar 18 and the upper bar 20 may also be a metal hollow tubes (such as 2" by 2"). The components may be formed of aluminum or steel and may be connected to one another, such as by welding. Alternatively, suitable plastics or composite materials could be used.

A ring 24 is mounted to the underside of the forward end of the upper bar 20. The ring 24 may be part of an eye bolt secured to the upper bar 20.

A hanger 26 is secured to the ring 24. The hanger 26 may have a central opening in which the ring 24 may be received. Alternatively, a connector (such as a loop or ring) secures the central opening of the hanger 26 to the ring 24. In this manner, the hanger 26 is pivotably secured to the upper bar 20. The hanger 26 may hang from an outer end of the upper bar 20 as shown.

A flexible strap 56 is connectable to each end of the hanger 26. At least one ratchet mechanism 58 (such as a ratchet on a ratchet strap) is provided on the strap 56. Loops or rings may connect the strap 56 and/or ratchet mechanism 58 to the outer ends of the hanger 26.

Figure 2:
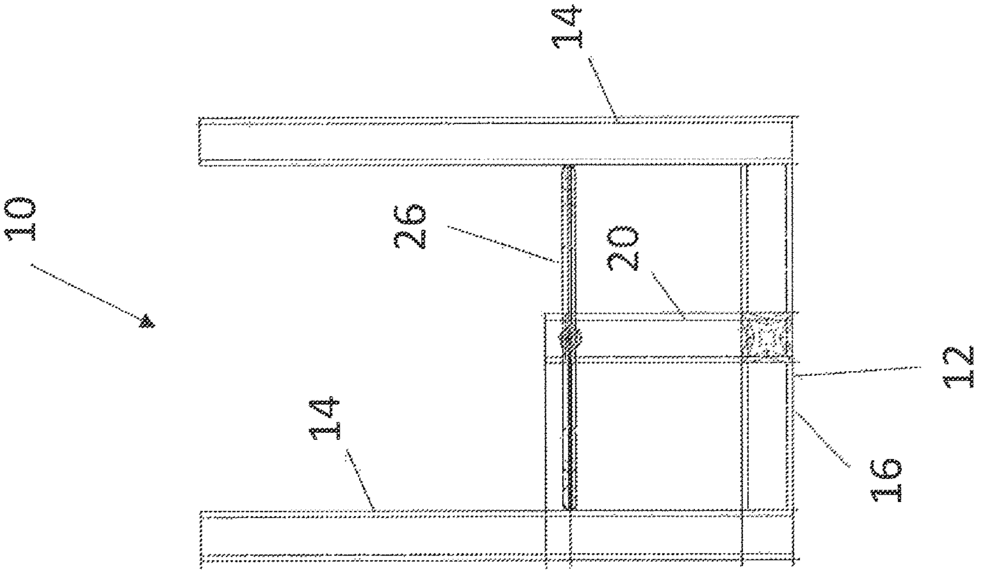
FIG. 2 is a top view of the wheelchair stand of FIG. 1.

FIG. 2 is a top view of the wheelchair stand 10 of FIG. 1. As shown, the upper bar 20 is less than half the length of the runners 14. For example, the upper bar 20 may be 10" and the runners 14 may 24". The overall width of the base 12 in this example is 18". The hanger 26 in this example is approximately 14" long.

Figure 3:
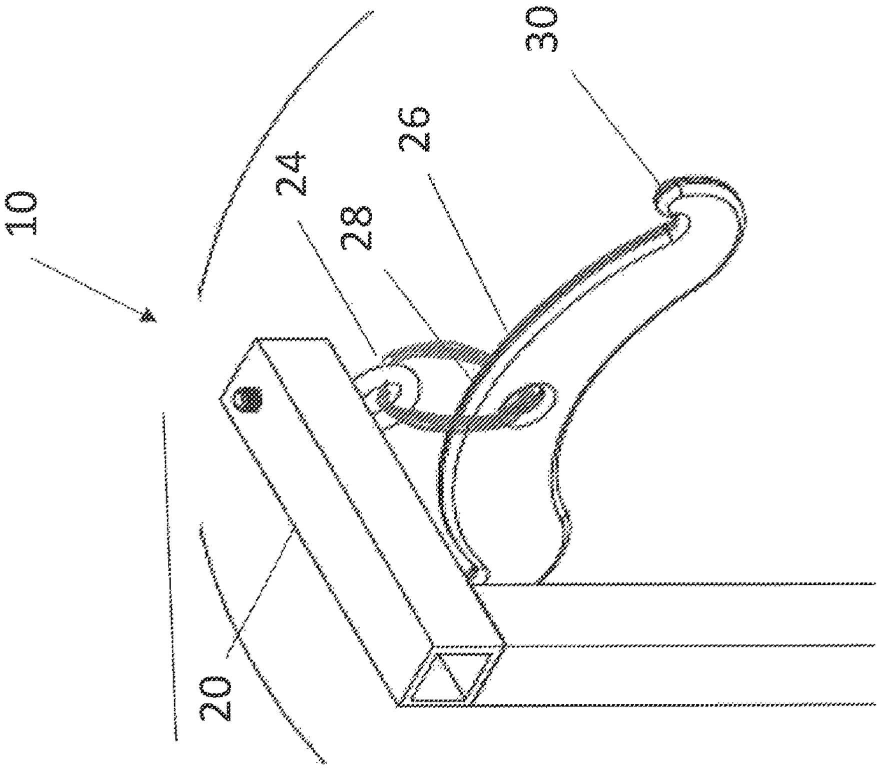
FIG. 3 is an enlarged view of an upper portion of the wheelchair stand of FIG. 1.

FIG. 3 is an enlarged view of the upper portion of the wheelchair stand 10 of FIG. 1. As shown, the hanger 26 is elongated, solid and narrow and includes a central portion 28 that is curved to be convex facing upward. Outer ends 30 of the hanger 26 curve sharply upward to provide hooks on which to retain straps, loops, rings, or chains.

Figure 4:
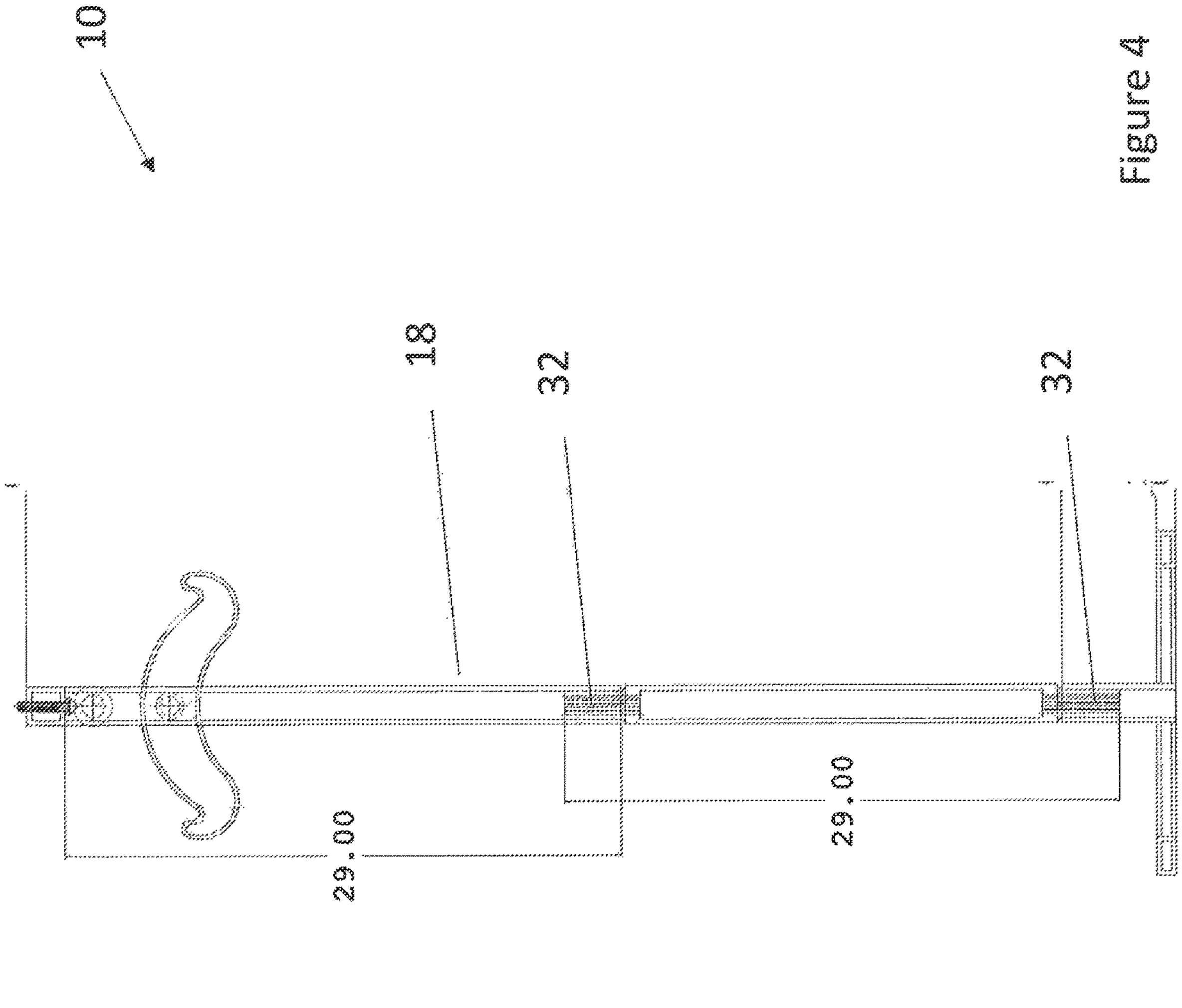
FIG. 4 is a section view of the wheelchair stand of FIG. 1.

FIG. 4 is a section view of the wheelchair stand 10. The sections of the vertical support bar 18 may be connected by connectors 32 received within adjacent hollow sections.

Figure 5:
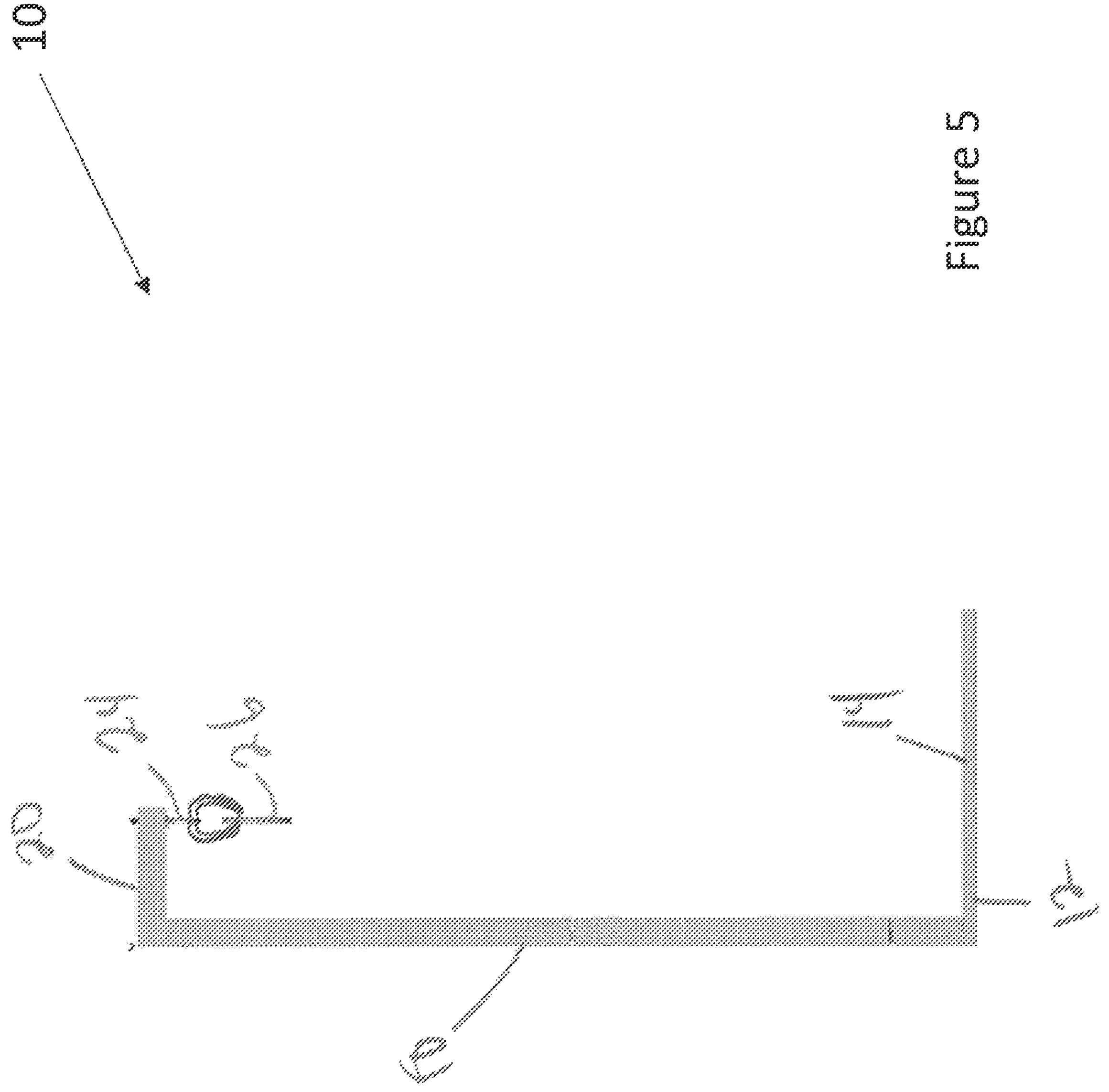
FIG. 5 is a side view of the wheelchair stand of FIG. 1.

FIG. 5 is a side view of the wheelchair stand 10.

Figure 6:
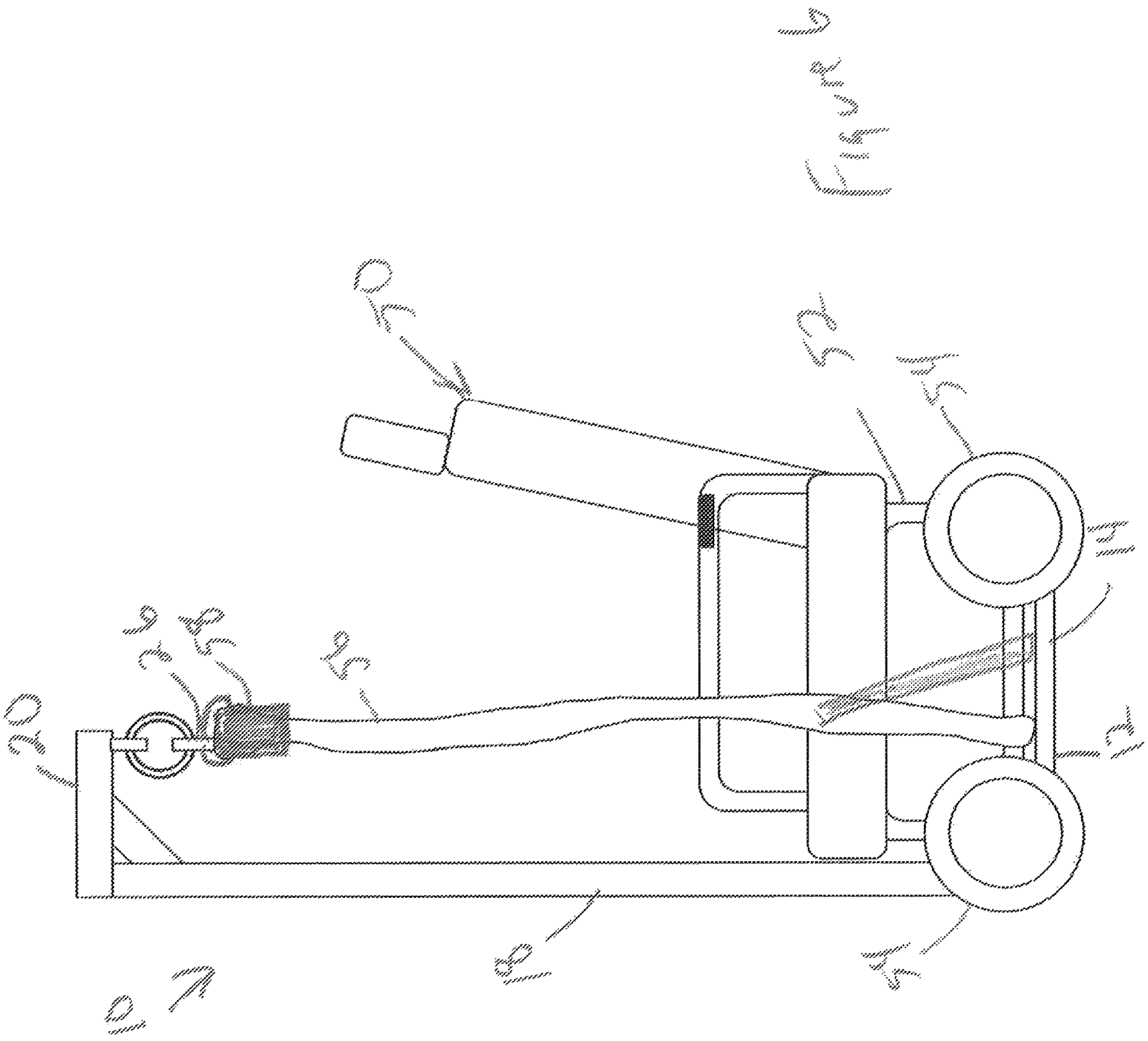
FIG. 6 is a perspective view of the wheelchair stand of FIG. 1 receiving a wheelchair.

FIG. 6 shows the wheelchair stand 10 in use. A powered wheelchair 50 is moved to a position over the base 12 of the wheelchair stand 10, with the base 52 of the wheelchair 50 over the runners 14 and the wheels 54 of the wheelchair 50 on either side of the runners 14. The base 52 of the wheelchair 50 may abut the vertical support bar 18. A strap 56 is secured to the outer ends 40 of the hanger 26 and looped below the base 52 of the wheelchair 50.

Referring to FIG. 7, the ratchet mechanism 58 is actuated in order to shorten the strap 56, thereby raising the wheelchair 50 off the floor. Then the user can perform maintenance and repairs on the wheelchair 50, such as removing/replacing the wheels 54. When complete, the user can release the ratchet mechanism 58 to place the wheelchair 50 on the floor and then remove the strap 56.

The wheelchair stand 10 makes it easier to repair and maintain a powered wheelchair.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. In combination:

a wheelchair stand comprising:

a base;

a vertical support bar extending upward from the base;

an upper bar extending transversely from the vertical support bar and spaced vertically away from the base;

a hanger supported by the upper bar and spaced away from the vertical support bar;

a strap supported by the hanger; and a ratchet secured to the strap and configured to shorten the strap;

the combination further including a wheelchair supported by the strap.

2. The combination of claim 1 wherein the hanger is pivotably connected to the upper bar.

3. The combination of claim 2 wherein the base includes a pair of runners extending forward from a rear bar.

4. The combination of claim 3 wherein the vertical support bar extends upward from the rear bar.

5. The combination of claim 4 wherein the hanger hangs from an outer end of the upper bar.

6. The combination of claim 5 wherein the wheelchair is supported above the pair of runners.

7. The combination of claim 6 wherein the wheelchair is supported above a floor on which the base is supported.

8. A method of maintaining a wheelchair including:

a) moving the wheelchair to a position below a hanger;

b) positioning a strap below the wheelchair;

c) connecting the strap to opposite ends of the hanger; and d) shortening the strap to raise the wheelchair.

9. The method of claim 8 wherein step d) includes actuating a ratchet to shorten the strap.

10. The method of claim 8 wherein step a) includes moving the wheelchair over a pair of runners extending below the hanger.

* * * * *